US005849155A

United States Patent [19]
Gasland

[11] Patent Number: 5,849,155
[45] Date of Patent: Dec. 15, 1998

[54] METHOD FOR DISPERSING CELLULOSE BASED FIBERS IN WATER

[75] Inventor: Stein Gasland, Rungsted Kyst, Denmark

[73] Assignee: E. Khashoggi Industries, LLC, Santa Barbara, Calif.

[21] Appl. No.: 500,890

[22] PCT Filed: Jan. 27, 1994

[86] PCT No.: PCT/DK94/00045

§ 371 Date: Nov. 6, 1995

§ 102(e) Date: Nov. 6, 1995

[87] PCT Pub. No.: WO94/18384

PCT Pub. Date: Aug. 18, 1994

[30] Foreign Application Priority Data

Feb. 2, 1993 [DK] Denmark .................... 0117/93

[51] Int. Cl.$^6$ .......................... D21H 11/14; D21H 17/20
[52] U.S. Cl. ................. 162/158; 162/168.1; 162/174; 162/177; 162/178; 162/183; 162/218; 264/176.1; 264/204
[58] Field of Search ...................... 162/101, 145, 162/146, 147, 158, 168.1, 174, 177, 178, 218, 183; 264/165, 175, 176.1, 204

[56] References Cited

U.S. PATENT DOCUMENTS

| | | |
|---|---|---|
| 109,669 | 11/1870 | Rowland . |
| 128,980 | 7/1872 | Rowland . |
| 591,168 | 10/1897 | Heinzerling . |
| 882,538 | 3/1908 | Sargent . |
| 1,223,834 | 4/1917 | Sänger . |
| 1,234,692 | 7/1917 | Poznanski . |
| 1,716,623 | 6/1929 | Collins . |
| 1,718,011 | 6/1929 | Vogt . |
| 1,874,974 | 8/1932 | Hammenecker . |
| 1,932,150 | 10/1933 | Tada . |
| 1,954,117 | 4/1934 | Caldwell . |
| 1,965,538 | 7/1934 | Stewart . |
| 2,045,099 | 6/1936 | Pond . |
| 2,170,102 | 8/1939 | Thompson . |
| 2,205,735 | 6/1940 | Scherer, Jr. . |
| 2,307,629 | 1/1943 | MacIldowie . |
| 2,432,971 | 12/1947 | Ruthman et al. . |
| 2,496,895 | 2/1950 | Staley . |
| 2,549,507 | 4/1951 | Morgan et al. . |
| 2,629,667 | 2/1953 | Kaveler . |
| 2,700,615 | 1/1955 | Hejmer et al. . |
| 2,754,207 | 7/1956 | Schur et al. . |
| 2,793,957 | 5/1957 | Mangold et al. . |
| 2,820,713 | 1/1958 | Wagner . |
| 2,837,435 | 6/1958 | Miller et al. . |
| 2,917,778 | 12/1959 | Lyon, Jr. et al. . |
| 2,943,013 | 6/1960 | Arledter . |
| 2,959,489 | 11/1960 | Wagner . |
| 2,968,561 | 1/1961 | Birnkrant . |
| 3,006,615 | 10/1961 | Mason, Jr. . |
| 3,007,222 | 11/1961 | Ragan . |

(List continued on next page.)

FOREIGN PATENT DOCUMENTS

| | | |
|---|---|---|
| 619559 | 5/1961 | Canada . |
| 627550 | 9/1961 | Canada . |
| 0 003 481 | 8/1979 | European Pat. Off. . |
| 0006390 A1 | 1/1980 | European Pat. Off. . |
| 0263723 A2 | 4/1988 | European Pat. Off. . |
| 0265745 A2 | 5/1988 | European Pat. Off. . |
| 0271853 B2 | 6/1988 | European Pat. Off. . |
| 0304401 B1 | 2/1989 | European Pat. Off. . |
| 0118240 B1 | 7/1989 | European Pat. Off. . |
| 0340707 A2 | 11/1989 | European Pat. Off. . |
| 0340765 A2 | 11/1989 | European Pat. Off. . |
| 0370913 B1 | 5/1990 | European Pat. Off. . |
| 0405146 B1 | 1/1991 | European Pat. Off. . |
| 0447797 A2 | 9/1991 | European Pat. Off. . |
| 0453980 A2 | 10/1991 | European Pat. Off. . |
| 0497151 A1 | 8/1992 | European Pat. Off. . |
| 0546956 A2 | 6/1993 | European Pat. Off. . |
| 0551954 A2 | 7/1993 | European Pat. Off. . |
| 0556774 A2 | 8/1993 | European Pat. Off. . |
| 0608031 A2 | 7/1994 | European Pat. Off. . |
| 0290007 A1 | 11/1998 | European Pat. Off. . |

(List continued on next page.)

OTHER PUBLICATIONS

Alexanderson, Self–Smoothing Floors Based on Polymer Cement Concrete, *Concrete International* (Jan. 1990).

Andersen, Control and Monitoring of Concrete Production–A Study of Particle Packing and Rheology, The Danish Academy of Technical Sciences (1990).

Andersen, *Effect of Organic Superplasticizing Admixtures and Their Components on Zeta Potential and Related Properties of Cement Materials*, Pennsylvania State University (1987).

Andersen, *Effects of W/C–Ratio and Dispersion on the Pore Size Distribution of Cement Paste and Concrete*, Paper prepared for MRL by Per Just Andersen (Aug. 1988).

Andersen, *Rheology of Cement Paste, Mortar and Concrete*.

Andersen, et al. *Tailoring of Cement–Bound Materials By the Use of Packing and Rheological Models* American Ceramic Society (1988).

Andersen, Tailoring of Concrete Materials, *R&H Annual Review* (1988).

Ashby, Materials Selection in Engineering Design, *Indian Journal of Technology*, vol. 28, 217–225 (Jun.–Aug. 1990).

(List continued on next page.)

Primary Examiner—Steven Alvo
Attorney, Agent, or Firm—Workman, Nydegger & Seeley

[57] ABSTRACT

The invention describes a method for dispersion of cellulose based fibers in water. The raw material, which particularly may be recycled paper, is first wetted with water. By a combination of addition of hydrocolloid which binds water, and strong kneading at high solid content, the mixture is transformed into a modulable paste. The high viscosity of the paste effectively conveys the shear forces of the kneading machine to make the fibers flexible and tear them apart. When the kneading is terminated, the hydrocolloid prevents the fibers from reassociation into fiber bundles.

18 Claims, No Drawings

U.S. PATENT DOCUMENTS

| | | |
|---|---|---|
| 3,027,266 | 3/1962 | Wikne . |
| 3,030,258 | 4/1962 | Wagner . |
| 3,042,578 | 7/1962 | Denning . |
| 3,052,595 | 9/1962 | Pye . |
| 3,097,929 | 7/1963 | Ragan . |
| 3,117,014 | 1/1964 | Klug . |
| 3,149,986 | 9/1964 | Zelmanoff . |
| 3,169,877 | 2/1965 | Bartoli et al. . |
| 3,215,549 | 11/1965 | Ericson . |
| 3,253,978 | 5/1966 | Bodendorf et al. . |
| 3,305,613 | 2/1967 | Spence . |
| 3,306,961 | 2/1967 | Spence . |
| 3,356,779 | 12/1967 | Schulze . |
| 3,393,261 | 7/1968 | Herzig et al. . |
| 3,432,317 | 3/1969 | Kelly et al. . |
| 3,458,329 | 7/1969 | Owens et al. . |
| 3,468,993 | 9/1969 | Bierlich . |
| 3,470,005 | 9/1969 | Flachsenberg et al. . |
| 3,492,385 | 1/1970 | Simunic . |
| 3,493,382 | 2/1970 | Ryan et al. . |
| 3,520,707 | 7/1970 | Steinberg et al. . |
| 3,526,172 | 9/1970 | Stuart . |
| 3,558,070 | 1/1971 | Gabriels . |
| 3,579,366 | 5/1971 | Rehmar . |
| 3,622,393 | 11/1971 | Sherwood . |
| 3,683,760 | 8/1972 | Silva . |
| 3,697,366 | 10/1972 | Harlock et al. . |
| 3,753,749 | 8/1973 | Nutt . |
| 3,754,954 | 8/1973 | Gabriel et al. . |
| 3,759,729 | 9/1973 | Fahn . |
| 3,770,859 | 11/1973 | Bevan . |
| 3,806,571 | 4/1974 | Rönnmark et al. . |
| 3,824,107 | 7/1974 | Weiant . |
| 3,827,895 | 8/1974 | Copeland . |
| 3,841,885 | 10/1974 | Jakel . |
| 3,857,715 | 12/1974 | Humphrey . |
| 3,902,912 | 9/1975 | Wolf . |
| 3,904,341 | 9/1975 | Putti . |
| 3,914,359 | 10/1975 | Bevan . |
| 3,917,781 | 11/1975 | Gabriel et al. . |
| 3,927,163 | 12/1975 | Gabriel et al. . |
| 3,952,130 | 4/1976 | Nason . |
| 3,954,490 | 5/1976 | Cockram . |
| 3,962,155 | 6/1976 | Usamoto et al. . |
| 3,968,004 | 7/1976 | Coffey et al. . |
| 3,989,534 | 11/1976 | Plunguian et al. . |
| 3,998,651 | 12/1976 | Baudouin et al. . |
| 4,002,482 | 1/1977 | Coenen . |
| 4,017,321 | 4/1977 | Reighter . |
| 4,017,324 | 4/1977 | Eggers . |
| 4,040,851 | 8/1977 | Ziegler . |
| 4,043,862 | 8/1977 | Roberts . |
| 4,044,166 | 8/1977 | Koizumi . |
| 4,070,196 | 1/1978 | Kraak et al. . |
| 4,070,199 | 1/1978 | Downing et al. . |
| 4,073,658 | 2/1978 | Ohtani et al. . |
| 4,076,846 | 2/1978 | Nakatsuka et al. . |
| 4,077,809 | 3/1978 | Plunguian et al. . |
| 4,080,213 | 3/1978 | Mori et al. . |
| 4,084,980 | 4/1978 | Motoki . |
| 4,085,001 | 4/1978 | Fukuwatari et al. . |
| 4,089,691 | 5/1978 | Cummisford et al. . |
| 4,093,690 | 6/1978 | Murray . |
| 4,094,077 | 6/1978 | Schrader et al. . |
| 4,117,059 | 9/1978 | Murray . |
| 4,117,060 | 9/1978 | Murray . |
| 4,124,550 | 11/1978 | Kobayashi et al. . |
| 4,132,555 | 1/1979 | Barrable . |
| 4,133,619 | 1/1979 | Wise . |
| 4,135,940 | 1/1979 | Peltier . |
| 4,149,550 | 4/1979 | Green et al. . |
| 4,157,998 | 6/1979 | Berntsson et al. . |
| 4,159,302 | 6/1979 | Greve et al. . |
| 4,172,154 | 10/1979 | von Rymon Lipinski . |
| 4,185,923 | 1/1980 | Bouette et al. . |
| 4,188,231 | 2/1980 | Valore . |
| 4,204,337 | 5/1980 | Roos et al. . |
| 4,209,336 | 6/1980 | Previte . |
| 4,210,490 | 7/1980 | Taylor . |
| 4,225,247 | 9/1980 | Hodson . |
| 4,225,357 | 9/1980 | Hodson . |
| 4,225,383 | 9/1980 | McReynolds . |
| 4,230,502 | 10/1980 | Lustig et al. . |
| 4,233,080 | 11/1980 | Koeppel . |
| 4,233,368 | 11/1980 | Baehr et al. . |
| 4,234,344 | 11/1980 | Tinsley et al. . |
| 4,239,716 | 12/1980 | Ishida et al. . |
| 4,244,781 | 1/1981 | Heckman . |
| 4,248,664 | 2/1981 | Atkinson et al. . |
| 4,249,991 | 2/1981 | Baes et al. . |
| 4,257,710 | 3/1981 | Delcoigne et al. . |
| 4,261,754 | 4/1981 | Krenchel et al. . |
| 4,269,657 | 5/1981 | Gomez et al. . |
| 4,271,228 | 6/1981 | Foster et al. . |
| 4,272,198 | 6/1981 | Velikov et al. . |
| 4,279,695 | 7/1981 | Winterbottom . |
| 4,299,790 | 11/1981 | Greenberg . |
| 4,303,690 | 12/1981 | Haas, Sr. et al. . |
| 4,305,758 | 12/1981 | Powers et al. . |
| 4,306,059 | 12/1981 | Yokobayashi et al. . |
| 4,310,996 | 1/1982 | Mulvey et al. . |
| 4,313,997 | 2/1982 | Ruff et al. . |
| 4,326,891 | 4/1982 | Sadler . |
| 4,328,136 | 5/1982 | Blount . |
| 4,329,177 | 5/1982 | George . |
| 4,333,863 | 6/1982 | Lindroth . |
| 4,353,748 | 10/1982 | Birchall et al. . |
| 4,362,679 | 12/1982 | Malinowski . |
| 4,370,166 | 1/1983 | Powers et al. . |
| 4,373,957 | 2/1983 | Pedersen . |
| 4,373,992 | 2/1983 | Bondoc . |
| 4,377,440 | 3/1983 | Gasland . |
| 4,378,271 | 3/1983 | Hargreaves et al. . |
| 4,379,198 | 4/1983 | Jaeschke et al. . |
| 4,383,862 | 5/1983 | Dyson . |
| 4,394,930 | 7/1983 | Korpman . |
| 4,406,703 | 9/1983 | Guthrie et al. . |
| 4,410,366 | 10/1983 | Birchall . |
| 4,410,571 | 10/1983 | Korpman . |
| 4,415,366 | 11/1983 | Copening . |
| 4,427,610 | 1/1984 | Murray . |
| 4,428,775 | 1/1984 | Johnson et al. . |
| 4,438,685 | 3/1984 | Haas, Sr. et al. . |
| 4,445,970 | 5/1984 | Post et al. . |
| 4,454,268 | 6/1984 | Otey et al. . |
| 4,462,835 | 7/1984 | Car . |
| 4,470,877 | 9/1984 | Johnstone et al. . |
| 4,487,657 | 12/1984 | Gomez . |
| 4,497,662 | 2/1985 | Chisholm et al. . |
| 4,508,595 | 4/1985 | Gasland ................................. 162/158 |
| 4,522,772 | 6/1985 | Bevan . |
| 4,524,628 | 6/1985 | Haas, Sr. et al. . |
| 4,524,828 | 6/1985 | Sabins et al. . |
| 4,529,653 | 7/1985 | Hargreaves et al. . |
| 4,529,662 | 7/1985 | Lancaster et al. . |
| 4,529,663 | 7/1985 | Lancaster et al. . |
| 4,533,393 | 8/1985 | Neuschaeffer et al. . |
| 4,533,581 | 8/1985 | Asaumi et al. . |
| 4,535,943 | 8/1985 | Couture . |
| 4,545,854 | 10/1985 | Gomez et al. . |
| 4,549,930 | 10/1985 | Dessauer . |
| 4,550,655 | 11/1985 | Haas, Sr. et al. . |
| 4,551,384 | 11/1985 | Aston et al. . |
| 4,552,463 | 11/1985 | Hodson . |

| Patent | Date | Inventor |
|---|---|---|
| 4,562,218 | 12/1985 | Fornadel et al. . |
| 4,567,049 | 1/1986 | Haas, Sr. et al. . |
| 4,585,486 | 4/1986 | Fujita et al. . |
| 4,588,443 | 5/1986 | Bache . |
| 4,595,623 | 6/1986 | Du Pont et al. . |
| 4,602,590 | 7/1986 | Haas, Sr. et al. . |
| 4,613,627 | 9/1986 | Sherman et al. . |
| 4,623,150 | 11/1986 | Moehlman et al. . |
| 4,624,855 | 11/1986 | Haas, Sr. et al. . |
| 4,625,856 | 12/1986 | Haas, Sr. et al. . |
| 4,636,345 | 1/1987 | Jensen et al. . |
| 4,637,860 | 1/1987 | Harper et al. . |
| 4,640,715 | 2/1987 | Heitzmann et al. . |
| 4,642,137 | 2/1987 | Heitzmann et al. . |
| 4,648,314 | 3/1987 | Plicht et al. . |
| 4,650,523 | 3/1987 | Kikuchi et al. . |
| 4,655,981 | 4/1987 | Nielsen et al. . |
| 4,669,603 | 6/1987 | Haas, Sr. et al. . |
| 4,673,438 | 6/1987 | Wittwer et al. . |
| 4,694,741 | 9/1987 | Haas, Sr. et al. . |
| 4,707,187 | 11/1987 | Tsuda et al. . |
| 4,707,221 | 11/1987 | Beer et al. . |
| 4,710,117 | 12/1987 | Haas, Sr. et al. . |
| 4,710,422 | 12/1987 | Fredenucci . |
| 4,711,669 | 12/1987 | Paul et al. . |
| 4,735,660 | 4/1988 | Cane . |
| 4,746,481 | 5/1988 | Schmidt . |
| 4,749,444 | 6/1988 | Lorz et al. . |
| 4,749,583 | 6/1988 | Branch . |
| 4,753,710 | 6/1988 | Langley et al. . |
| 4,754,589 | 7/1988 | Leth . |
| 4,755,494 | 7/1988 | Ruben . |
| 4,772,439 | 9/1988 | Trevino-Gonzalez . |
| 4,775,580 | 10/1988 | Dighton . |
| 4,786,670 | 11/1988 | Tracy et al. . |
| 4,789,244 | 12/1988 | Dunton et al. . |
| 4,797,161 | 1/1989 | Kirchmayr et al. . |
| 4,799,961 | 1/1989 | Friberg . |
| 4,814,012 | 3/1989 | Paul et al. . |
| 4,828,650 | 5/1989 | Wagle et al. . |
| 4,833,191 | 5/1989 | Bushway et al. . |
| 4,836,940 | 6/1989 | Alexander . |
| 4,840,672 | 6/1989 | Baes . |
| 4,846,932 | 7/1989 | Karita et al. . |
| 4,861,649 | 8/1989 | Browne . |
| 4,863,655 | 9/1989 | Lacourse et al. . |
| 4,868,142 | 9/1989 | Waisala et al. . |
| 4,872,913 | 10/1989 | Dunton et al. . |
| 4,879,173 | 11/1989 | Randall . |
| 4,888,059 | 12/1989 | Yamaguchi et al. . |
| 4,889,428 | 12/1989 | Hodson . |
| 4,889,594 | 12/1989 | Gavelin . |
| 4,892,589 | 1/1990 | Kirkland et al. . |
| 4,892,590 | 1/1990 | Gill et al. . |
| 4,895,598 | 1/1990 | Hedberg et al. . |
| 4,912,069 | 3/1990 | Ruben . |
| 4,919,758 | 4/1990 | Wagle et al. . |
| 4,921,250 | 5/1990 | Ayers . |
| 4,923,665 | 5/1990 | Andersen et al. . |
| 4,925,530 | 5/1990 | Sinclair et al. . |
| 4,927,573 | 5/1990 | Alpár et al. . |
| 4,927,656 | 5/1990 | Ito . |
| 4,935,097 | 6/1990 | Tashiro et al. . |
| 4,939,192 | 7/1990 | t'Sas . |
| 4,941,922 | 7/1990 | Snyder . |
| 4,943,349 | 7/1990 | Gomez . |
| 4,944,595 | 7/1990 | Hodson . |
| 4,948,429 | 8/1990 | Arfaei . |
| 4,952,278 | 8/1990 | Gregory et al. . |
| 4,953,453 | 9/1990 | Haas, Sr. et al. . |
| 4,957,558 | 9/1990 | Ueda et al. . |
| 4,957,754 | 9/1990 | Munk et al. . |
| 4,963,309 | 10/1990 | Gohlisch et al. . |
| 4,963,603 | 10/1990 | Felegi, Jr. et al. . |
| 4,975,473 | 12/1990 | Kaneda et al. . |
| 4,979,992 | 12/1990 | Bache . |
| 4,985,119 | 1/1991 | Vinson et al. . |
| 4,999,056 | 3/1991 | Rasmussen . |
| 5,017,268 | 5/1991 | Clitherow et al. . |
| 5,021,093 | 6/1991 | Beshay . |
| 5,030,282 | 7/1991 | Matsuhashi et al. . |
| 5,032,413 | 7/1991 | Haas et al. . |
| 5,032,414 | 7/1991 | Haas et al. . |
| 5,035,930 | 7/1991 | Lacourse et al. . |
| 5,037,600 | 8/1991 | Upchurch . |
| 5,039,003 | 8/1991 | Gordon et al. . |
| 5,039,378 | 8/1991 | Pommier et al. . |
| 5,039,560 | 8/1991 | Durgin et al. . |
| 5,043,196 | 8/1991 | Lacourse et al. . |
| 5,047,086 | 9/1991 | Hayakawa et al. . |
| 5,048,403 | 9/1991 | Haas, Sr. et al. . |
| 5,049,237 | 9/1991 | Bohm et al. . |
| 5,051,217 | 9/1991 | Alpár et al. . |
| 5,061,346 | 10/1991 | Taggart et al. . |
| 5,071,512 | 12/1991 | Bixler et al. . |
| 5,076,985 | 12/1991 | Koch et al. . |
| 5,082,500 | 1/1992 | Nachtman et al. . |
| 5,085,366 | 2/1992 | Durgin et al. . |
| 5,085,707 | 2/1992 | Bundy et al. . |
| 5,089,186 | 2/1992 | Moore et al. . |
| 5,095,054 | 3/1992 | Lay et al. . |
| 5,096,650 | 3/1992 | Renna . |
| 5,102,596 | 4/1992 | Lempfer et al. . |
| 5,103,717 | 4/1992 | Haas, Sr. et al. . |
| 5,104,487 | 4/1992 | Taggart et al. . |
| 5,104,669 | 4/1992 | Wolke et al. . |
| 5,106,880 | 4/1992 | Miller et al. . |
| 5,108,677 | 4/1992 | Ayers . |
| 5,108,679 | 4/1992 | Rirsch et al. . |
| 5,110,413 | 5/1992 | Steer . |
| 5,122,231 | 6/1992 | Anderson . |
| 5,126,013 | 6/1992 | Wiker et al. . |
| 5,126,014 | 6/1992 | Chung . |
| 5,132,155 | 7/1992 | Singh et al. . |
| 5,134,179 | 7/1992 | Felegi, Jr. et al. . |
| 5,139,615 | 8/1992 | Conner et al. . |
| 5,141,797 | 8/1992 | Wheeler . |
| 5,141,983 | 8/1992 | Hasegawa et al. . |
| 5,151,130 | 9/1992 | Croft et al. . |
| 5,153,037 | 10/1992 | Altieri . |
| 5,154,771 | 10/1992 | Wada et al. . |
| 5,156,718 | 10/1992 | Neubert . |
| 5,160,368 | 11/1992 | Begovich . |
| 5,160,676 | 11/1992 | Singh et al. . |
| 5,162,126 | 11/1992 | Thömer et al. . |
| 5,167,894 | 12/1992 | Baumgarten . |
| 5,178,677 | 1/1993 | Haas et al. . |
| 5,178,730 | 1/1993 | Bixler et al. . |
| 5,184,995 | 2/1993 | Kuchenbecker . |
| 5,185,382 | 2/1993 | Neumann et al. . |
| 5,186,990 | 2/1993 | Starcevich . |
| 5,194,206 | 3/1993 | Koch et al. . |
| 5,201,403 | 4/1993 | Haas, Sr. et al. . |
| 5,206,087 | 4/1993 | Tokiwa et al. . |
| 5,208,267 | 5/1993 | Neumann et al. . |
| 5,221,435 | 6/1993 | Smith, Jr. . |
| 5,224,595 | 7/1993 | Sugimoto et al. . |
| 5,232,496 | 8/1993 | Jennings et al. . |
| 5,240,561 | 8/1993 | Kaliski . |
| 5,248,702 | 9/1993 | Neumann et al. . |
| 5,250,153 | 10/1993 | Izard et al. ............................ 162/152 |
| 5,252,271 | 10/1993 | Jeffs . |
| 5,253,743 | 10/1993 | Haas, Sr. et al. . |
| 5,256,711 | 10/1993 | Tokiwa et al. . |

| | | |
|---|---|---|
| 5,258,430 | 11/1993 | Bastioli et al. |
| 5,262,458 | 11/1993 | Bastioli et al. |
| 5,264,030 | 11/1993 | Tanabe et al. |
| 5,264,080 | 11/1993 | Shaw et al. |
| 5,266,368 | 11/1993 | Miller . |
| 5,268,187 | 12/1993 | Quinlan . |
| 5,269,845 | 12/1993 | Grunau et al. |
| 5,272,181 | 12/1993 | Boehmer et al. |
| 5,273,167 | 12/1993 | Haas et al. |
| 5,273,821 | 12/1993 | Olson et al. |
| 5,275,774 | 1/1994 | Bahr et al. |
| 5,277,762 | 1/1994 | Felegi, Jr. et al. |
| 5,277,764 | 1/1994 | Johansson et al. |
| 5,278,194 | 1/1994 | Tickner et al. |
| 5,279,658 | 1/1994 | Aung . |
| 5,284,672 | 2/1994 | Ito . |
| 5,288,318 | 2/1994 | Mayer et al. |
| 5,288,765 | 2/1994 | Bastioli et al. |
| 5,290,350 | 3/1994 | Besnard et al. |
| 5,294,299 | 3/1994 | Zeuner et al. |
| 5,298,273 | 3/1994 | Ito . |
| 5,300,333 | 4/1994 | Wilkerson et al. |
| 5,308,879 | 5/1994 | Akamatu et al. |
| 5,314,754 | 5/1994 | Knight . |
| 5,316,624 | 5/1994 | Racine . |
| 5,317,037 | 5/1994 | Golden et al. |
| 5,317,119 | 5/1994 | Ayers . |
| 5,320,669 | 6/1994 | Lim et al. |
| 5,338,349 | 8/1994 | Farrar . |
| 5,340,558 | 8/1994 | Friedman et al. |
| 5,346,541 | 9/1994 | Goldman et al. |
| 5,354,424 | 10/1994 | Rha et al. |
| 5,360,586 | 11/1994 | Wyatt et al. |
| 5,362,776 | 11/1994 | Barenberg et al. |
| 5,362,777 | 11/1994 | Tomka . |
| 5,372,877 | 12/1994 | Kannankeril . |
| 5,376,320 | 12/1994 | Tiefenbacher et al. |
| 5,411,639 | 5/1995 | Kurrle . |
| 5,500,089 | 3/1996 | Huang et al. |
| 5,506,277 | 4/1996 | Griesbach, III . |
| 5,512,090 | 4/1996 | Franke . |
| 5,512,378 | 4/1996 | Bastioli . |
| 5,585,432 | 12/1996 | Lee et al. ............................... 162/145 |

FOREIGN PATENT DOCUMENTS

| | | |
|---|---|---|
| 1278195 | 10/1961 | France . |
| 2642731 | 8/1990 | France . |
| 3011330 | 3/1980 | Germany . |
| 2841172 | 4/1980 | Germany . |
| 3346970 A1 | 7/1985 | Germany . |
| 3420195 A1 | 12/1985 | Germany . |
| 4008862 C1 | 4/1991 | Germany . |
| 47-20190 | 9/1972 | Japan . |
| 51-2729 | 1/1976 | Japan . |
| 53-16730 | 2/1978 | Japan . |
| 54-31320 | 3/1979 | Japan . |
| 54-48821 | 3/1979 | Japan . |
| 55-37407 | 3/1980 | Japan . |
| 55-100256 | 7/1980 | Japan . |
| 56-17965 | 2/1981 | Japan . |
| 58-120555 | 7/1983 | Japan . |
| 60-260484 | 12/1985 | Japan . |
| 60-264375 | 12/1985 | Japan . |
| 62-36055 | 2/1987 | Japan . |
| 62-36056 | 2/1987 | Japan . |
| 62-39204 | 2/1987 | Japan . |
| 62-46941 | 2/1987 | Japan . |
| 62-253407 | 11/1987 | Japan . |
| 63-22636 | 1/1988 | Japan . |
| 63-123851 | 5/1988 | Japan . |
| 63-210082 | 8/1988 | Japan . |
| 63-218589 | 9/1988 | Japan . |
| 63-248759 | 10/1988 | Japan . |
| 63-310780 | 12/1988 | Japan . |
| 64-37478 | 2/1989 | Japan . |
| 2-51460 | 2/1990 | Japan . |
| 2-141484 | 5/1990 | Japan . |
| 2-190304 | 7/1990 | Japan . |
| 3-80141 | 4/1991 | Japan . |
| 3-153551 | 7/1991 | Japan . |
| 3-187962 | 8/1991 | Japan . |
| 3-202310 | 9/1991 | Japan . |
| 3-202313 | 9/1991 | Japan . |
| 3-208847 | 9/1991 | Japan . |
| 4-70304 | 3/1992 | Japan . |
| 5-105815 | 4/1993 | Japan . |
| 5-171049 | 7/1993 | Japan . |
| 5-246417 | 9/1993 | Japan . |
| 5-230401 | 12/1993 | Japan . |
| 6-32386 | 2/1994 | Japan . |
| 6-135487 | 5/1994 | Japan . |
| 4-361698 | 6/1995 | Japan . |
| 9100590 | 11/1992 | Netherlands . |
| 490820 | 8/1938 | United Kingdom . |
| 1584387 | 2/1981 | United Kingdom . |
| 2086748 | 5/1982 | United Kingdom . |
| 2050459 | 6/1983 | United Kingdom . |
| 2192392 | 1/1988 | United Kingdom . |
| 2208651 | 4/1989 | United Kingdom . |
| 2214516 | 9/1989 | United Kingdom . |
| 2220934 | 1/1990 | United Kingdom . |
| WO 87/00828 | 2/1987 | WIPO . |
| WO 89/02225 | 3/1989 | WIPO . |
| WO 91/12186 | 8/1991 | WIPO . |
| WO 92/04408 | 3/1992 | WIPO . |
| WO 93/01242 | 1/1993 | WIPO . |
| WO 94/18384 | 8/1994 | WIPO . |
| WO 94/18388 | 8/1994 | WIPO . |

OTHER PUBLICATIONS

Ashby, Overview No. 80: On the Engineering Properties of Materials, *Acta Metall,* vol. 37, No.5, 1273–1293 (1989).

Attwood, Paperboard, *The Wiley Encyclopedia of Packaging Technology* 500–506 (Marilyn Bakker ed., 1986).

Bach, *Cement–Based Products Processed the Plastics Way.*

Bache, *Densified Cement/Ultra–Fine Particle–Based Materials,* Presented at the Second International Conference on Superplasticizers in Concrete, Ottawa, Ontario, Canada (Jun. 10–12, 1981).

Bajza, On The Factors Influencing the Strength of Cement Compacts, *Cement and Concrete Research,* vol. 2, 67–78 (1972).

Balaguru, et al., *Flexural Behavior of Slurry Infiltrated Fiber Concrete (SIFCON) Made Using Condensed Silica Fume.*

Baum, et al., Paper, *Kirk–Othmer Concise Encyclopedia of Chemical Technology,* 834–836 (Martin Grayson ed., 1985).

Benbow, et al., The Extrusion Mechanics of Paste–The Influence of Paste Formulation on Extrusion Parameters, *Chemical Engineering Science,* vol. 42, No. 9, 2151–2162 (1987).

Berg and Young, Introduction to MDF Cement Composites, *Cementing the Future, ACBM,* vol. 1, No. 2 (Fall 1989).

Berger, et al., Acceleration of Hydration of Calcium Silicates by Carbon Dioxide Treatment, *Nature Physical Science,* vol. 240 (Nov. 6, 1972).

Biomat 32–Production Unit for Natural Packaging, *Starch Foam Dishes at Burger King's.*

Bi otec Product Literature, Undated Publication.

Blaha, Ideas in Concrete, *Concrete Products* (Sep. 1992).

Brady, et al., *Materials Handbook,* 588–594 (1991).

Brown, et al., *An Investigation of a High Speed Shear Mixer on Selected Pastes and Mortars,* Materials Research Society Symp. Proc., vol. 137 (1989).

Bukowski, et al., *Reactivity and Strength Development of $CO_2$ Activated Non–Hydraulic Calcium Silicates,* Cement and Concrete Research, vol. 9, 57–68 (1979).

Cementing the Future: A New Extrusion Technology, *ACBM,* vol. 6, No. 1 (Spring 1994).

Clauson–Kaas, et al., *Ekstrudering af Fiberbeton–delrapport,* Teknologisk Institut, Byggeteknik, (Jan. 1987).

English Translation: Clauson–Kaas, et al., *Extrusion of Fiber Concrete–Interim Report,* Department of Building Technology, Technological Institute of Denmark.

Clauson–Kaas, *Opsrøjtet Glasfiberbeton i Byggeriet,* Teknologisk Institut, Byggeteknik, (1987) (No translation).

Collepardi, et al., *Influence of Polymerization of Sulfonated Naphthalene Condenate and Its Interaction With Cement,* SP 68–27.

Davidson, et al., *Water–Soluble Resins,* New York: Reinhold Publishling Corp., Chapman & Hall, Ltd., London, (1962).

Eriksen and Andersen, *Foam Stability Experiments on Solutions Containing Superplasticizing and Air–Entraining Agents for Concrete,* The Technological Institute, Department of Building Technology, Taastrup, Denmark, 1985.

Fedors and Landel, An Empirical Method of Estimating the Void Fraction in Mixtures of Uniform Particles of Different Size, *Powder Technology,* 23, 225–231 (1978).

Ferretti, Distributed Reinforcement Concrete Pipes: An Innovative Product, *Concrete International,* (May 1993).

*Fiberton—nyt,* Teknologisk Institut, Byggeteknik, Blad nr. 1 (Oct. 1987).

English translation—*Fiber Concrete News,* The Technological Institute of Denmark, Department of Building Technology, Pamphlet No. 1 (Oct. 1987).

Fördös, Natural or Modified Cellulose Fibres As Reinforcement in Cement Composites, *Concrete Technology and Design,* vol. 5, Natural Fiber Reinforced Cement and Concrete (1988).

Fumas, Grading Aggregates, Mathematical Relations for Beds of Broken Solids of Maximum Density, *Industrial and Engineering Chemistry,* vol. 23, No. 9, (1988).

Greminger, Jr., and Krumel, *Alkyl and Hydroxyalkylalkycellulose,* Dow Chemical U.S.A., Midland, Michigan.

Hewlett, *Physico–Chemical Mechanisms of Admixtures,* Lecture, CGLI Advanced Concrete Technology Course, Cement and Concrete Association Training Center, (May 1, 1975).

Hlaváč, The Technology of Glass and Ceramics, *Glass Science and Technology,* 4: The Technology of Glass and Ceramics, Elsevier Publishing (1983).

Hyland, F–Flute Inches Its Way Into Folding Carton Market, *Paperboard Packaging,* 28–29 (May 1993).

Johansen and Andersen, Particle Packing and Concrete Properties, *Materials Science of Concrete II,* 111–147.

Jones and Berard, Raw Materials Processing, *Ceramics: Industrial Processing and Testing,* Iowa State University Press (1972).

Kline, Corrugating Operations and Raw Materials, *Paper and Paperboard: Manufacturing and Converting Fundamentals,* 184–195, 2nd ed., Miller Freeman Publications, Inc. (1991).

Kline, Paperboard and Properties, *Paper and Paperboard Manufacturing and Converting Fundamentals,* 19–28, 2nd ed., (1982).

Knab, et al., Effects of Maximum Void Size and Aggregate Characteristics on the Strength of Mortar, *Cement and Concrete Research,* vol. 13, 383–390 (1983).

Lawrence, The Properties of Cement Paste Compacted Under High Pressure: Research Report 19, *Cement and Concrete Association Research,* Jun. 1969).

Lecznar, et al., Strength of Neat Cement Pastes Molded Under Pressure, *Journal of the American Concrete Institute,* Concrete Briefs, (Feb. 1961).

Lewis and Kriven, *Microstructure–Property Relationships in Macro–Defect–Free Cement,* MRS Bulletin (Mar. 1993).

Lewis, Sr., *Condensed Chemical Dictionary,* 870 (12th ed. 1993).

Litvan, et al., Particulate Admixture for Enhanced Freeze–Thaw Resistance of Concrete, *Cement and Concrete Research,* vol. 8, 53–60, Pergamon Press, Inc. (1978).

Manson, et al., *Use of Polymers in Highway Concrete,* National Cooperative Highway Research Program Report 190, Transportation Research Board of the National Research Council, (1978).

Maries, *The Activation of Portland Cement by Carbon Dioxide.*

Maycock and Skalny, Carbonation of Hydrated Calcium Silicates, *Cement and Concrete Research,* vol. 4, 69–76 (1974).

McGeary, Mechanical Packing of Spherical Particles, *Journal of the American Ceramic Society*—Blumenthal and Whitmore, vol. 44, No. 10, (Oct. 1961).

Miyake et al., Superplasticized Concrete Using Refined Lignosulfonate and its Action Mechanism, *Cement and Concrete Research,* vol. 15, No. 2, 295–302 (1985).

Naaman, et al., Tensile Stress–Strain Properties of SIFCON, *ACI Materials Journal* (May–Jun. 1989).

Niël, *Supplementary Paper II–117. The Influence of Alkali–Carbonate on the Hydration of Cement* (1986).

*Nye Metoder i Beton Kan Betyde Teknisk Knock–out For Plast.*

English Translation—*New Method for Concrete May Mean Technical Knock–Out for Plastic,* The Engineer, No. 14 (1986).

Osbæck and Johansen, *Particle Size Distribution and Rate of Strength Development,* F. L. Smidth & Company A/S, Denmark.

Patankar and Mandal, The Packing of Some Non–Spherical Solid Particles, *Trans J. British Ceramic Society,* vol. 79, 59–66, (1980).

*Plastic–Forming Processes.*

Purton, The Effect of Sand Grading On The Calcium Silicate Brick Reaction, *Cement and Concrete Research,* vol. 4, 13–29 (1974).

Putman, et al., Papermaking Additives, *Kirk–Othmer Concise Encyclopedia of Chemical Technology,* 836–837 (Martin Grayson ed., 1985).

*Report of the Panel on Solids Processing.*

Ridgway and Tarbuck, Particulate Mixture Bulk Densities, *Chemical and Process Engineering,* (Feb. 1968).

Robinson, Extrusion Defects, *Structures Produced by Extrusion,* 391–407.

Rosenberg, et al., *A New Mineral Admixture for High–Strength Concrete–Proposed Mechanism for Strength Enhancement,* Second International Conference on the Use of Fly Ash, Silica Fume, Slag and Natural Pozzoplans in Concrete, Madrid, Spain (Apr. 21–25, 1986).

Roy, New Strong Cement Materials: Chemically Bonded Ceramics, *Science,* vol. 235–6 (Feb. 6, 1987).

Roy, et al., *Processing of Optimized Cements and Concretes Via Particle Packing,* MRS Bulletin (Mar. 1993).

Roy, et al., Very High Strength Cement Pastes Prepared by Hot Pressing and Other High Pressure Techniques, *Cement and Concrete Research,* vol. 2, 349–366 (1972).

Sequa Chemicals, Inc., Technical Data, *Sunrez® 700 Series Insolubilizers Coating Additive.*

Sikora, Paper, *The Wiley Encyclopedia of Packing Technology,* 497–500 (Marilyn Bakker ed., 1986).

Skalny, et al., Low Water to Cement Ratio Concretes, *Cement and Concrete Research,* vol. 3, 29–40 (1973).

Skalny and Bajza, Properties of Cement Pastes Prepared by High Pressure Compaction, *ACI Journal,* Title No. 67–11, (Mar. 1970).

Soroushian, et al., Recycling of Wood and Paper in Cementitious Materials, *Materials Research Society Symposium Proc.,* vol. 266, (1992).

Staley Starch and Specialty Products Group, Technical Data, *Sta–Lok® 400 Cationic Potato Starch.*

Stix, Concrete Solutions, *Scientific American* (Apr. 1993).

Strabo, et al., Cemenbaserede Hybridkompositter, Teknologisk Institut, Byggeteknik, TR–Projekt 1985–133/177–85.533 (1987).

English translation—Strabo, et al., *Cement–Based Hybrid Composites,* Technological Institute of Denmark, Department of Building Technology, TR–Project 1985–133/177–85.533 (1987).

Strabo, et al., *Fiberbeton Teknologi,* Teknologisk Institut, Byggeteknik, TR–Projekt 133/117–82.042 (1986).

English translation—Strabo, et al., *Fiber Concrete Technology,* Technological Institute of Denmark, Department of Building Technology, TR–Project 133/117–82.042 (1986).

Strabo, et al., *Ekstrudering af Fiberton,* Teknologisk Institut, Byggeteknik, TR–Projekt 1985–133/177–85.538 (Oktober 1987).

English translation—Strabo, et al., *Extrusion of Fiber Concrete,* Danish Technological Institute, Department of Building Technology, TR–Project 1985–133/177–85.538 (Oct. 1987).

Strabo, et al., *Nye Formgivningsmetoder til Fiberton,* Teknologisk Institut, Byggeteknik, TR–Projekt 1984–133/117–84.028 (Apr. 1987).

English translation—Strabo, et al., *New Design Methods for Fiber Concrete,* Technological Institute of Denmark, Department of Buidling Technology, TR–Project 1984–133/117–84.028 (Apr. 1987).

Studt, New Advances Revive Interest In Cement–Based Materials, *R&D Magazine* (Nov. 1992).

Sun et al., *The Composition of Hydrated DSP Cement Pastes.*

Suzuki, et al., Formation and Carbonation of C–S–H In Water, *Cement and Concrete Research,* vol. 15, 213–214 (1985).

Swientek, Formidable Films, *Prepared Foods,* 118–121 (Sep. 1993).

*The Coating Process for Paper* (1993).

*The Colcrete Process: Its History, Advantages, and Applications,* Undated Publication.

*Thermoforming Process Guide,* Dow Plastics.

Unwalla, et al., Recycled Materials for Making Concrete, *The Concrete Journal,* vol. 53, No. 9 (Sep. 1979).

Verbeck, Carbonation of Hydrated Portland Cement, Cement and Concrete, *Special Technical Publication No. 203,* American Society for Testing Materials, (1958).

Vrana, Khashoggi Kin Reported Planning Private Placement of Shares in New Container Firm, *Los Angeles Business Journal,* (Mar. 28, 1993).

Wagner, Polymer Modification of Portland Cement Systems, *Chemtech* (Feb. 1973).

Weinrich, *German Comes Up With Recycled Product to Replace Foam Chips.*

Weiss, et al., *High Tensile Cement Pastes as a Low–Energy Substitute for Metals, Plastics, Ceramics, and Wood. Phase I: Preliminary Technological Evaluation,* CTL Project CR7851–4330, Final Report Prepared for U.S. Dept. of Energy (Nov. 1984).

Westman and Hugill, *The Packing of Particles* (1930).

Young, Macro–Defect–Free Cement: A Review, *Materials Research Society Symposium Proc.,* vol. 179, (1991).

Yudenfreund, et al., Hardened Portland Cement Pastes of Low Porosity II., Exploratory Studies, Dimensional Changes, *Cement and Concrete Research,* vol. 2, 331–348 (1972).

*Zien In The Food Industry,* Freeman Industries, Inc.

Zukoski and Struble, Rheology of Cementitious Systems, *MRS Bulletin* (Mar. 1993).

METHOD FOR DISPERSING CELLULOSE BASED FIBERS IN WATER

The invention concerns dispersion of cellulose fibres by strong mechanical agitation after addition of hydrocolloid and at solid content up to 80%. This preparation results in a moulding composition, which is suitable for formation of cellulose containing fibre products.

By traditional production of paper and board, the raw material fibre is first dispersed in water in a mixer called pulper at very low solid content of only a few percent. The rest, normally more than 95%, is water.

Pulpers of special construction are described in the European patent applications 126.632 and 189.379. In these applications, pride is expressed of being able to work at solid contents a little above 20%.

In the paper industry it is generally accepted that the mentioned high amount of water is necessary for efficient treatment of the fibres to soften them, to make them expand, and thus to ease their dispersion with the aid of the pulper's propeller.

The low solid content, which is used for traditional pulping of fibres and also for the very formation of paper, have made the paper industry utilise giant units which have to produce day and night the year around in order to pay the very high capital costs. The vast amount of water, has to be removed from the fibres afterwards. This results in environmental problems because of the high water usage, and most of all because part of the fibres and part of the employed additives run into the effluent as pollutants.

This invention solved these problems with a new method to disperse cellulose based fibres in water, which method comprises dispersion at solid content up to 80% after addition of one or more hydrocolloids during strong mechanical action.

Even though the inventor does not like to be bound to any theory for the mechanism being behind the invention, it is assumed that the hydrocolloid has a double function during the dispersion. It results in a high viscosity mixture, which is able to convey the forces from the agitator out to the individual fibres to tear them apart, and secondly there is a chemical affinity between the hydroxyl groups on the fibres and on the hydrocolloid so that the colloid penetrates in between the fibres, coats them and prevents them from reassociation.

The dispersion is done in a particularly strong mixer, preferably in a kneading machine which can be heated.

The invention is particularly intended as a preparatory step to new forming methods for paper and board, which are based on plastic forming by extrusion, injection moulding, coating, pressing or rolling. To get a good moulding composition for such use perfect dispersion of the fibres is not enough. It is also necessary to use so much hydrocolloid that the water is completely bound; more explicit that free water cannot be seen on the surface of the moulding paste, just after it has been pressed out through the die of an extruder. If free (glossy) water can be seen on the surface of the string coming out of the die, it has been found in practice, that after only a short time the die is clogged by fibres, which have lost water and hydrocolloid. Complete water-binding is also an advantage for preparation of the moulding composition.

The moulding composition can be prepared at different temperatures. High temperature is particularly interesting, because it is then possible to disperse the fibres at still higher solid content than at ambient temperature. The upper limit for temperature is ca. 200° C., as cellulose and hydrocolloid then start to discolour and decompose.

It has been shown that the moulding composition stands the high pressure which occurs during the kneading and in extruders by forming of the composition.

Manufacturing of cellulose containing fibre products, according to this invention, may be simplified if separation of the fibres of the raw material and forming of the fibre products is done as an unbroken process, f.inst. so that the mixture is first kneaded at high temperature in the first part of a cook extruder and after that, possibly after cooling, it is formed by passing the die at the exit of the extruder or by being injected into a mould (injection moulding).

Fibres, which can be used with advantage, are fibres of cellulose, semi chemical pulp, groundwood or recirculated waste paper.

Hydrocolloids, which may be used, are among others starch, starch derivative, dextrin, polyvinylalcohol, cellulose derivatives such as carboxymethylcellulose or hydroxyethylcellulose, animal protein like casein, vegetable protein f.inst. from soya bean, vegetable gums like guar gum or locust bean gum, alginate, synthetic hydrocolloids as f.inst. polyacrylamide or flour from cereals like wheat, oat, rye, barley, rice etc., or from tubers as f.inst. potato or tapioca.

The amount of hydrocolloid needed for complete binding of the water depends on the water content of the mixture and still more on the water-binding efficiency of the colloid. With cheap hydrocolloid such as flour, the needed amount of colloid is about 4–20% of the amount of water, and with super efficient colloid like f.inst. polyacrylamide 0.4–2% of the water is sufficient.

It is particularly interesting to use cheap hydrocolloid, which has to be heated to gelatinise f.inst. a normal native starch. The starch may be added in ungelatinised form and brought to gelatinization after it has been mixed with the fibres and the water, by heat either supplied as such or liberated from the energy used for the kneading. When the starch gelatinises, this is clearly observed, as the mixture transforms from an inhomogeneous mixture to a homogeneous high viscosity paste; similar to a smooth dough.

Both dispersion of the fibres and forming of the fibre products is easiest carried out at a fair solid content of about 55%. However, after the forming there has to be a drying, and this is more elaborated at low solid content. It is therefore of advantage to perform the dispersion of the fibres at lower solid content than the forming.

As an example the dispersion of the fibres may be started by hot kneading at 40% solid content. During this treatment water evaporates from the kneader, and the fibres get a perfect distribution when the solid content approaches 55%. The fibres are further worked up with heat supply in the kneader until the solid content reaches 75%. The subsequent forming needs somewhat higher pressure at 75% solids than at 55%, but this drawback and the inconvenience of the extra evaporation is more than counterbalanced by easier final drying.

The hydrocolloids have a tendency to make the moulding composition sticky and may thus cause production problems. This stickiness may be reduced by adding processing aids such as wax and latex emulsions. The stickiness can also be reduced by increasing the solid content, f.inst. as described in the previous paragraph. In this way the moulding composition gets reduced adhesion to other objects and higher internal cohesion. Addition of wax with correctly chosen melting point may also increase the speed of forming, as the paste solidifies faster by cooling, f.inst. in an injection mould.

Below follows a description of some experiments, which were done to stipulate the conditions which are needed to obtain a moulding composition, which after compression to a thin sheet and careful examination appears perfectly homogeneous without occurrence of any fibre bundles.

The four first described experiments were done in a laboratory mixer of the type Brabender Plasti-Corder PI 2000. This is a mixer which gives a very strong kneading, and which may be heated. It is designed to imitate the agitation which takes place inside the extruders being used in the plastic industry. The mixer is composed of two thick paddles, which rotate with small distance to each other and to the walls of the chamber, much the same way as in a gear pump. The speed of rotation chosen for those experiments, which now are to be described, was 30 rpm. Mixer temperature was adjusted to 105° C. Temperature of the mixture and the torque to the paddles were automatically recorded on a diagram.

A pre-mix of 115 g unprinted newsprint paper moistened with 260 cc water was used for all the trials. These two basic components were mixed together in a domestic mix-master of the make Braun KM 32, and in which the mixing is done with a claw. This mixing was not sufficient to disintegrate the paper, so the pre-mix consisted of small pieces of paper soaked in water.

Experiment 1 was made for the sake of reference without hydrocolloid. The trial showed very clearly that the mixer did not succeed in transforming the mixture into a paste. Instead, the high forces in the mixer pressed water out of the mixture with such violence that water splashed out of the mixer. The torque quickly reached levels above 3 Nm, and it was impossible to obtain homogeneous distribution of the fibres.

Experiment 2 was done as Experiment 1, however with the difference that 30 g maize starch was added to the pre-mix. The starch gelatinised quickly in the mixer, during which the mixture transformed to a paste, and the torque was thereafter only 0.5 Nm. The kneading was continued for 7 minutes during which the solid content increased as a result of evaporation of water. After the 7 minutes the torque reached 3 Nm, and at the used rpm of 30, this is empirically known to be close to the maximum of which can be handled by injection moulding of plastic. The paste was taken out of the mixer, and it was found to be comparatively homogeneous, and the solid content was measured to be 45%.

Experiment 3 was done as Experiment 2, except for the difference that the amount of maize starch was doubled to 60 g. The behaviour of the mix was similar, but the paste became more sticky and had a tendency to stick to the walls of the mixing chamber. The torque was in the beginning 0.5 Nm and reached 3 Nm after 6 minutes. The mixer was stopped, and the sample taken out. It was perfectly homogeneous, and the solid content was 52%.

Experiment 4 was done as Experiment 3, but additionally to the 60 g maize starch 8 g stearic acid was also added. The stearin proved to give two advantages: The stickiness disappeared, and further it became possible to achieve a higher solid content before the torque reached 3 Nm. The last effect is probably because melted stearin improves flowability of the paste. The sample released steam in the mixer for the whole of 10 minutes, before the torque reached 3 Nm, and when the sample after that was taken out, it showed a solid content of 58%. Distribution of the fibres was perfect.

Experiment 5 was done to establish the importance of strong kneading. Trial 4 was repeated, but in the domestic mix-master Braun KM 32 instead of in the Brabender mixer. The sample was alternately heated to 95° C. in a microwave oven and agitated in the mix-master. Even though this treatment was done in a fast sequence and repeated many times, it was impossible to achieve a homogeneous paste, so it is concluded that stronger mechanical agitation is necessary to perform the invention.

Trial 6 was done directly in a twin screw extruder intended for plastic and of the make Berstorf EO 7618/86. The mix was greater than for the trials described above, but the mixing ratio was about the same as for trials 4 and 5, namely 115 g unprinted newsprint paper moistened with 260 cc water and with addition of 60 g maize starch and 13 g stearic acid. The temperature in the extruder was adjusted to 95° C. The extruder effectively transformed the inhomogeneous mixture into a homogeneous paste, which came out of the extruder die in the shape of a string with 1 mm diameter. Fibre distribution was perfect.

There was an evaporation of water from the hot string, after it left the die. By making the paste pass through the extruder many times, it was possible to increase the solid content to 80%, before at 95° C. the paste became so hard and brittle that it had lost its mouldability.

I claim:

1. A method for dispersing cellulose based fibers in water comprising the steps of:
   combining together water, a fibrous material, and a hydrocolloid to form an initial fibrous mixture in which the fibrous material is not initially dispersed in the water and has an initial solids content in a range from about 35% to about 80% by weight of the initial fibrous mixture, wherein sufficient hydrocolloid is included so as to bind substantially all of the water;
   kneading the initial fibrous mixture using strong mechanical action in order to liberate and disperse individual fibers from the fibrous material and form a final fibrous mixture in which the fibers are substantially dispersed throughout the final fibrous mixture; and
   shaping the final fibrous mixture into a desired shape by a process selected from the group consisting of extrusion, injection molding, coating, pressing, rolling, and combinations thereof.

2. A method as defined in claim 1, wherein the hydrocolloid is included in the initial fibrous mixture at a sufficient initial concentration such that all of the water is completely bound within the initial fibrous mixture.

3. A method as defined in claim 2, wherein the weight of the hydrocolloid in the initial fibrous mixture is in a range from about 0.4% to about 20% of the weight of the water that is initially included in the initial fibrous mixture.

4. A method as defined in claim 1, wherein dispersion of the fibers during the kneading step is conducted at a temperature of about 200° C. or less.

5. A method as defined in claim 1, wherein the fibrous material comprises fibers that are selected from the group consisting of cellulose, semichemical cellulose, groundwood, and recycled paper.

6. A method as defined in claim 1, wherein the hydrocolloid comprises starch or a starch derivative.

7. A method as defined in claim 1, wherein the hydrocolloid is initially added to the initial fibrous mixture in an ungelatinized form, and is thereafter gelatinized by supplying thermal energy to the fibrous mixture.

8. A method as defined in claim 1, further including the step of heating the fibrous mixture in order to evaporate a portion of the water in order to further increase the solids concentration.

9. A method as defined in claim 1, wherein the hydrocolloid is selected from the group consisting of polyvinyl alcohol, cellulose derivatives, proteins, vegetable gums, synthetic hydrocolloids, and flours.

10. A method as defined in claim 1, further comprising the step of adding to the fibrous mixture a material selected from the group consisting of waxes, latex emulsions, and combinations of the foregoing.

11. A method for dispersing cellulose based fibers in water comprising the steps of:

combining together water, a fibrous material, and a hydrocolloid to form an initial fibrous mixture in which the fibrous material is not initially dispersed in the water and having an initial solids content in a range from about 40% to about 80% by weight of the initial fibrous mixture, wherein sufficient hydrocolloid is included so as to bind substantially all of the water;

kneading the initial fibrous mixture using strong mechanical action in order to liberate and disperse individual fibers from the fibrous material and form a final fibrous mixture in which the fibers are substantially dispersed throughout the final fibrous mixture while heating the final fibrous mixture in order to evaporate a portion of the water in order to further increase the solids concentration; and shaping the final fibrous mixture into a desired shape by a process selected from the group consisting of extrusion, injection molding, coating, pressing, rolling, and combinations thereof.

12. A method as defined in claim 11, wherein the amount of hydrocolloid initially included in the initial fibrous mixture is sufficiently high such that all the water is completely bound within the initial fibrous mixture.

13. A method as defined in claim 11, wherein dispersion of the fibers during the kneading step is conducted at a temperature no greater than about 200° C.

14. A method as defined in claim 11, wherein the fibrous material comprises fibers that are selected from the group consisting of cellulose, semichemical cellulose, groundwood, and recycled paper.

15. A method as defined in claim 11, wherein the hydrocolloid comprises starch or a starch derivative.

16. A method as defined in claim 11, wherein the hydrocolloid is selected from the group consisting of polyvinyl alcohol, cellulose derivatives, proteins, vegetable gums, synthetic hydrocolloids, and flours.

17. A method as defined in claim 11, wherein the hydrocolloid is initially added to the initial fibrous mixture in an ungelatinized form, and is thereafter gelatinized by supplying thermal energy to the fibrous mixture.

18. A method for dispersing cellulose based fibers in water, comprising the steps of:

combining water, a fibrous material comprising agglomerated fibers, and a hydrocolloid to form an initial fibrous mixture in which the fibrous material is not initially dispersed in the water, the hydrocolloid being included at a sufficient concentration such that the water is completely bound within the initial fibrous mixture, wherein the fibrous material is included in an amount in a range from about 35% to about 80% by weight of the initial fibrous mixture;

kneading the initial fibrous mixture at a temperature of less than about 200° C. using strong mechanical action in order to liberate and disperse individual fibers from the fibrous material and form a final fibrous mixture in which the fibers are substantially dispersed throughout the final fibrous mixture while heating the fibrous mixture in order to evaporate a portion of the water in order to further increase the solids concentration; and shaping the final fibrous mixture into a desired shape by a process selected from the group consisting of extrusion, injection molding, coating, pressing, rolling, and combinations thereof.

* * * * *

UNITED STATES PATENT AND TRADEMARK OFFICE
CERTIFICATE OF CORRECTION

PATENT NO. : 5,849,155             Page 1 of 2
DATED : December 15, 1998
INVENTOR(S) : Stein Gasland It is certified that error appears in the above-indentified patent and that said Letters Patent is hereby corrected as shown below:

Cover Page, right column, abstract, line 6, after "into a" change "modulable" to --mouldable--

Page 4, Other Publications, line 29, change "Bi otec" to --Biotec--

Page 5, Other Publications, right column, line 26, after "McGeary" change "Mechani cal" to --Mechanical--

Col. 2, line 7, after "process," change "f.inst" to --for instance--

Col. 2, line 9, after "passing" insert --through--

Col. 2, line 18, after "protein" change "f.nst" to --for instance--

Col. 2, line 20, before "polyacrylamide" change "f.ist" to --for instance--

Col. 2, line 28, after "like" change "f.ist" to --for instance--

Col. 2, line 31, after "gelatinise" change "f.int" to --for instance--

Col. 2, line 40, after "is" change "easies" to --most easily--

UNITED STATES PATENT AND TRADEMARK OFFICE
CERTIFICATE OF CORRECTION

PATENT NO. : 5,849,155
DATED : December 15, 1998
INVENTOR(S) : Stein Gasland

It is certified that error appears in the above-indentified patent and that said Letters Patent is hereby corrected as shown below:

Col. 2, line 59, after "content" change "f.inst to --for instance--

Col. 2, line 64, after "cooling" change f.inst" to --for instance--

Signed and Sealed this

Twelfth Day of October, 1999

Attest:

Q. TODD DICKINSON

Attesting Officer     Acting Commissioner of Patents and Trademarks